UNITED STATES PATENT OFFICE.

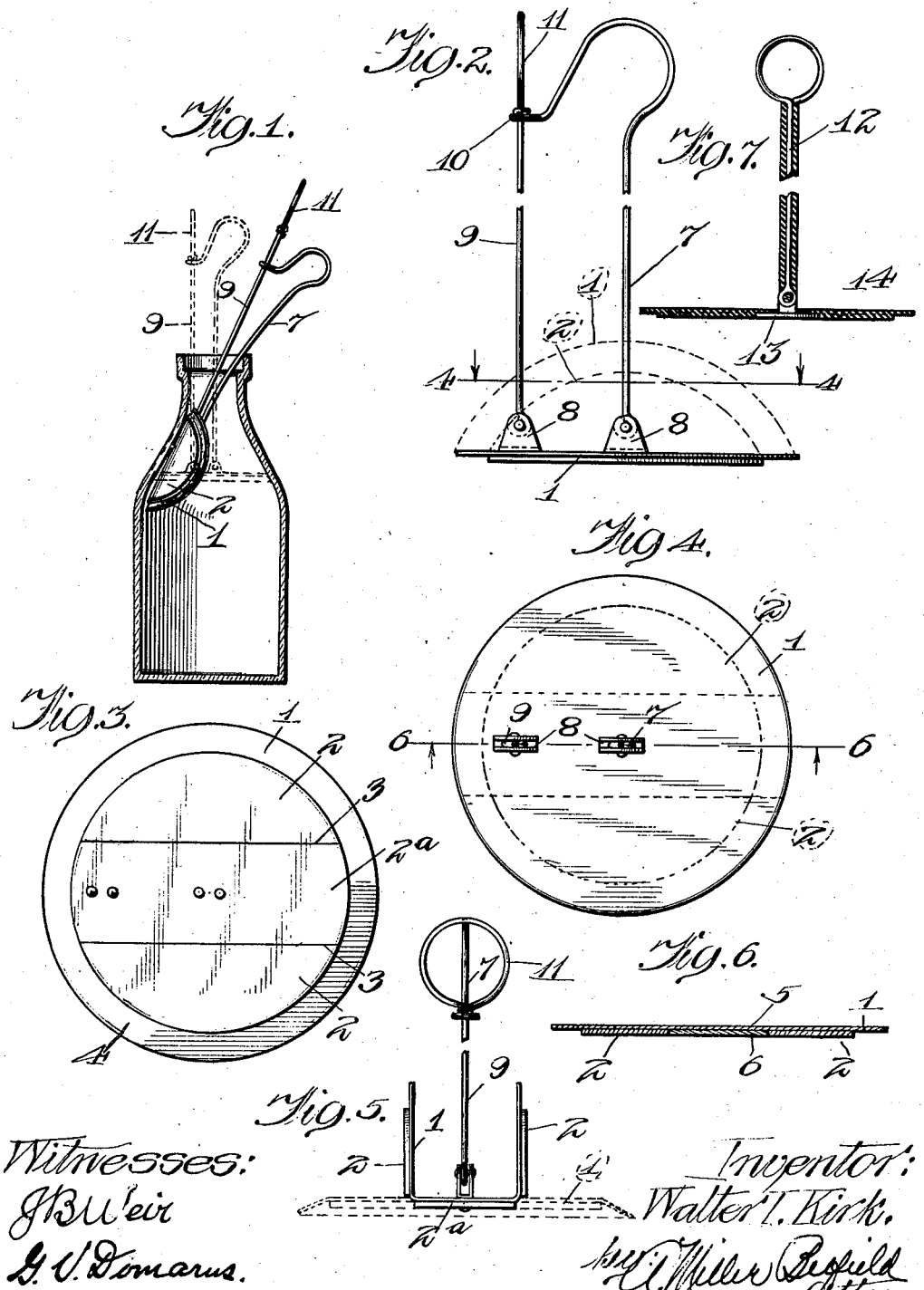

WALTER I. KIRK, OF CHICAGO, ILLINOIS, ASSIGNOR OF ONE-HALF TO HARRY D. KIRK, OF CHICAGO, ILLINOIS.

CREAM-SEPARATING DEVICE.

No. 859,885.     Specification of Letters Patent.     Patented July 9, 1907.

Application filed September 18, 1905. Serial No. 279,001.

*To all whom it may concern:*

Be it known that I, WALTER I. KIRK, a citizen of the United States, residing at Chicago, in the county of Cook and State of Illinois, have invented a certain new and useful Improvement in Cream-Separating Devices, of which the following is a full, clear, concise, and exact description, reference being had to the accompanying drawings, forming a part of this specification.

My invention relates to devices for permitting the withdrawal of the cream and not the milk from bottles containing bottled milk.

In accordance with my invention I arrange for the insertion of a diaphragm or partition between the milk and the cream, so that the bottle can be inverted or partially inverted, to permit the cream to run out while the milk remains in the bottle, held therein by the diaphragm or partition.

In this application I show one form of device for manually inserting such a diaphragm or partition in the milk bottle between the milk and the cream. It will be understood however, that I do not wish to confine myself to the particular device herein shown, as it is obvious that other forms of devices can be employed for accomplishing this result.

In the accompanying drawings Figure 1 is a view of a milk bottle with a device embodying my present invention inserted therein. Fig. 2 is a view of the device itself. Fig. 3 is a bottom view of the device. Fig. 4 is a view looking downwardly, on line 4—4 in Fig. 2. Fig. 5 is a view of the device in condition to be inserted in the bottle. Fig. 6 is a section taken on line 6—6 in Fig. 4. Fig. 7 is a modified form of construction.

The device which I show in the drawings for carrying out the invention, comprises a diaphragm or partition 1, conveniently made in the form of a circular disk. This can be made of rubber or any other suitable material. As a preferable arrangement, it is constructed with two hinged sections 2, 2, Fig. 3, which can be bent along the lines 3, 3 as shown in Fig. 5. The annular edge of the disk is desirably made of flexible material, so that it can be bent over, as shown in dotted lines Fig. 5. A convenient form of construction is to make the diaphragm or partition of a layer 5, Fig. 6, of flexible material, and another layer 6 of stiff material, which is formed in three parts, so as to permit the opening of the two parts as shown in Fig. 5, about the hinges formed by the flexible material 5.

A handle is pivotally connected with the disk 1 as by a clip 8, Fig. 2, and an operating rod 9 is pivotally connected with one end of a central portion 2ª, formed between hinged portions or sections 2, 2. The operating rod 9 extends through a loop or ring 10 formed at the end of the handle 7, and is provided with a ring handle 11, Fig. 5; thus the rod 9 can be slid back and forth in the loop 10 and the handle 11 serves as a stop to limit the downward movement of said rod.

It will be seen by this construction when the rod 9 is operated, it causes the disk 1 to swing about its pivotal connection with the handle 7. By drawing the rod 9 upwardly, the disk 1 will be swung up so as to assume a position parallel with said operating rod and handle as shown in Fig. 1.

In operating the device, the hinge sections 2, 2 are desirably bent up as shown in Fig. 5, and then the rod 9 drawn up so as to swing said disk into a longitudinal position as shown in Fig. 1, and then the device is lowered into a bottle. It is inserted sufficiently to come into position between the cream and the milk, and then the rod 9 is pushed down so as to place the disk 1 into a crosswise position as shown in Fig. 1, the device being manipulated by the hands so that the disk 1 will come into position crosswise of the bottle between the milk and the cream, thereby forming a partition separating the two. The bottle is then turned on its side sufficiently to allow the cream to run out, the milk remaining inside of the bottle.

A modified form of construction is shown in Fig. 7, in which figure, a vertical rod 12 is secured eccentrically and pivotally to a small metal disk 13. The rod 12 is desirably coated with rubber, and the rubber disk 14 is molded outside of the small metal disk 13. This device can thus be inserted in the bottle and then manipulated so as to bring the rubber disk between the milk and the cream with the same result as before.

It will be understood as stated before, I do not wish to confine myself to the particular form of device herein set forth, for other forms of devices can be employed to accomplish the same purpose.

What I claim is:

1. A device of the class specified, comprising a partition having a flexible periphery and adapted to fit against the walls of a bottle neck, and means whereby said partition can be inserted into and withdrawn from the bottle.

2. A device of the class specified, comprising a partition, a handle pivoted near the middle of the partition, and an operating rod connected with the partition near its periphery, whereby the partition can be turned to assume a position longitudinally of the handle to permit its insertion into and withdrawal from a bottle.

3. A device of the class specified, comprising a partition adapted for insertion into a bottle neck and capable of fitting against the walls of said neck so as to close the same, a handle 7 pivoted to the partition near its middle, and an operating rod 9 pivoted to the partition near its outer edge and extended through a ring 10 formed at the end of the handle 7.

4. A device of the class specified, comprising a collapsible partition and devices attached thereto, whereby the partition can be inserted into a bottle neck in a collapsed condition and then spread out and fitted against the sides of the bottle neck to close the same.

5. A device of the class specified, comprising a partition adapted to close one part of a bottle from another, and means whereby said partition can be inserted in a bottle in a longitudinal position, and then turned to a crosswise position.

6. A device of the class specified, comprising a disk made with a flexible periphery and formed with hinged sections, handle 7 pivotally connected with the center of said disk, an operating rod 9 pivotally connected at one side of the center or handle 7, the handle having a loop 10 through which the rod 9 is extended, and the rod 9 being provided with a handle 11 adapted to strike the loop 10, and thereby serve as a stop for the downward movement of said rod.

7. A device of the class specified, comprising a partition adapted for insertion into and through the neck of a bottle, and also adapted to fit against the sides of the bottle neck after insertion, and means attached to said partition for inserting and withdrawing the same.

8. A device of the class specified, comprising a foldable partition and a rod carrying said partition, the partition being pivotally secured to the rod so as to permit it to be swung lengthwise of the rod to permit insertion into the bottle neck.

9. A device of the class specified, comprising a foldable partition and a rod carrying said partition, the partition being pivotally secured to the rod so as to permit it to be swung lengthwise of the rod to permit insertion into the bottle neck, and a second rod attached to said partition at one side of the aforesaid rod, for swinging the partition about its pivotal connection therewith.

10. A device of the class described for the uses and purposes set forth, consisting of a flexible substantially flat circular member for entrance into a bottle, and a carrying member to which such flexible member is loosely attached and on which it has free movement.

11. In a device of the class described, a flexible disk, a member from which it is suspended, and a device carried on said member for contacting with and tipping the disk for the purposes herein described.

In witness whereof, I hereunto subscribe my name this 15th day of September, A. D. 1905.

WALTER I. KIRK.

Witnesses:
A. MILLER BELFIELD,
A. P. ROSS.